FIP8102 XR 3,271,679

Sept. 6, 1966 B. FOSTOFF 3,271,679

FREQUENCY MODULATION COMMUNICATION SYSTEM HAVING AUTOMATIC FREQUENCY DERIVATION CONTROL IN RESPONSE TO RECEIVED THERMAL NOISE

Filed Feb. 4, 1963 5 Sheets-Sheet 1

Inventor

BORIS FOSTOFF

BY Holcombe, Wetherill & Brisebois

Attorneys

Inventor
BORIS FOSTOFF
By Holcombe, Wetherill & Brisebois
Attorneys

Sept. 6, 1966 B. FOSTOFF 3,271,679

FREQUENCY MODULATION COMMUNICATION SYSTEM HAVING AUTOMATIC FREQUENCY DERIVATION CONTROL IN RESPONSE TO RECEIVED THERMAL NOISE

Filed Feb. 4, 1963 5 Sheets-Sheet 3

Inventor

BORIS FOSTOFF

By Holcombe, Wetherill & Brisebois

Attorneys

Inventor
BORIS FOSTOFF
By Holcombe, Wetherill & Brisebois
Attorneys

Sept. 6, 1966 B. FOSTOFF 3,271,679

FREQUENCY MODULATION COMMUNICATION SYSTEM HAVING AUTOMATIC FREQUENCY DERIVATION CONTROL IN RESPONSE TO RECEIVED THERMAL NOISE

Filed Feb. 4, 1963 5 Sheets-Sheet 5

Inventor

BORIS FOSTOFF

By Holcombe, Wetherill & Brisebois

Attorneys 3,271,679
Patented Sept. 6, 1966

3,271,679

FREQUENCY MODULATION COMMUNICATION SYSTEM HAVING AUTOMATIC FREQUENCY DERIVATION CONTROL IN RESPONSE TO RECEIVED THERMAL NOISE

Boris Fostoff, Maisons-Laffitte, France, assignor to Compagnie Francaise Thomson-Houston, Paris, France, a French body corporate Filed Feb. 4, 1963, Ser. No. 255,993
Claims priority, application France, Feb. 6, 1962, 887,070, Patent 1,322,204
9 Claims. (Cl. 325—31)

The present invention relates to improvements in frequency modulated communication systems, e.g. microwave radio links, and more particularly to arrangements for maintaining an optimum signal to noise ratio in the received frequency modulated signals.

The quality of an information signal at the receiver depends on several factors and more particularly on the distortions and disturbances it has suffered in its path from its point of origin to its point of arrival. It is usually possible to reduce the distortions satisfactorily by conventional means. This is not true in the case of the disturbances which have very varied characteristics more difficult to eliminate, particularly when the transmission is a long distance transmission utilizing different carrier means (cable, radio beam etc.).

The present invention seeks to improve the quality of the resulting signals by improved means which operate, by reducing the disturbances and especially by improving the signal to noise ratio through automatic selection of the optimum working conditions.

The information signal is disturbed by the combination of several noises having both fast and slow fluctuations. The two chief ones are thermal noise and intermodulation (or cross-modulation) noise. The equation for thermal noise is:

$$P_T = K_0 \times \frac{K_1}{P_r} \qquad (1)$$

in which:

$P_T$=power of thermal noise at the receiver output,
$P_r$=power of the signal at the receiver input,
$K_0$, $K_1$=coefficients depending on the intrinsic characteristics of the receiver.

Similarly, intermodulation noise, can be expressed for practical purposes, by the two-term polynomial expression:

$$P_I = K_0 \times K_2 \times \overline{\Delta F^4} + K_0 \times K_3 \times \overline{\Delta F^6} \qquad (2)$$

in which $P_I$=power of the intermodulation noise,
$\overline{\Delta F}$=effective frequency excursion or deviation of the signal,
$K_2$, $K_3$=coefficients characterising the linearity of the receiver,
$K_0$=as defined above.

The signal power $P_S$ at the receiver output is given by:

$$P_S = K_0 \times \overline{\Delta F^2} \qquad (3)$$

The general relation obtained by combining the Equations 1, 2 and 3 and giving the ratio of the noise power $P_B$ to the signal power $P_S$ is:

$$\frac{P_B}{P_S} = \frac{P_T + P_I}{P_S} = \frac{(1)+(2)}{(3)} = \frac{\frac{K_0 K_1}{P_r} + K_0 K_2 \overline{\Delta F^4} + K_0 K_3 \overline{\Delta F^6}}{K_0 \overline{\Delta F^2}}$$

or $$\frac{P_B}{P_S} = \frac{K_1}{P_r \overline{\Delta F^2}} + K_2 \overline{\Delta F^2} + K_4 \overline{\Delta F^4} \qquad (4)$$

It can be shown by analysis that to each value of parameter $P_r$ there corresponds a particular value of the frequency deviation $\Delta F$ for which the noise-to-signal ratio $P_B/P_S$ will be a minimum.

The system of the present invention essentially provides for the control of the effective frequency excursion or deviation $\Delta F$ of the transmitted signal as a function of the received signal strength $P_r$, so as to maintain at all times the noise to signal ratio $P_B/P_S$ at its afore-mentioned minimum value regardless of variations in signal strength $P_r$.

The improvements proposed by the present invention will, by way of example, be described in their application to a frequency-modulated microwave multichannel telephone system.

Various other objects and characteristics of the invention will appear from the following description, given by way of non-limiting example, and with reference to the accompanying drawings, in which.

Figure 1:
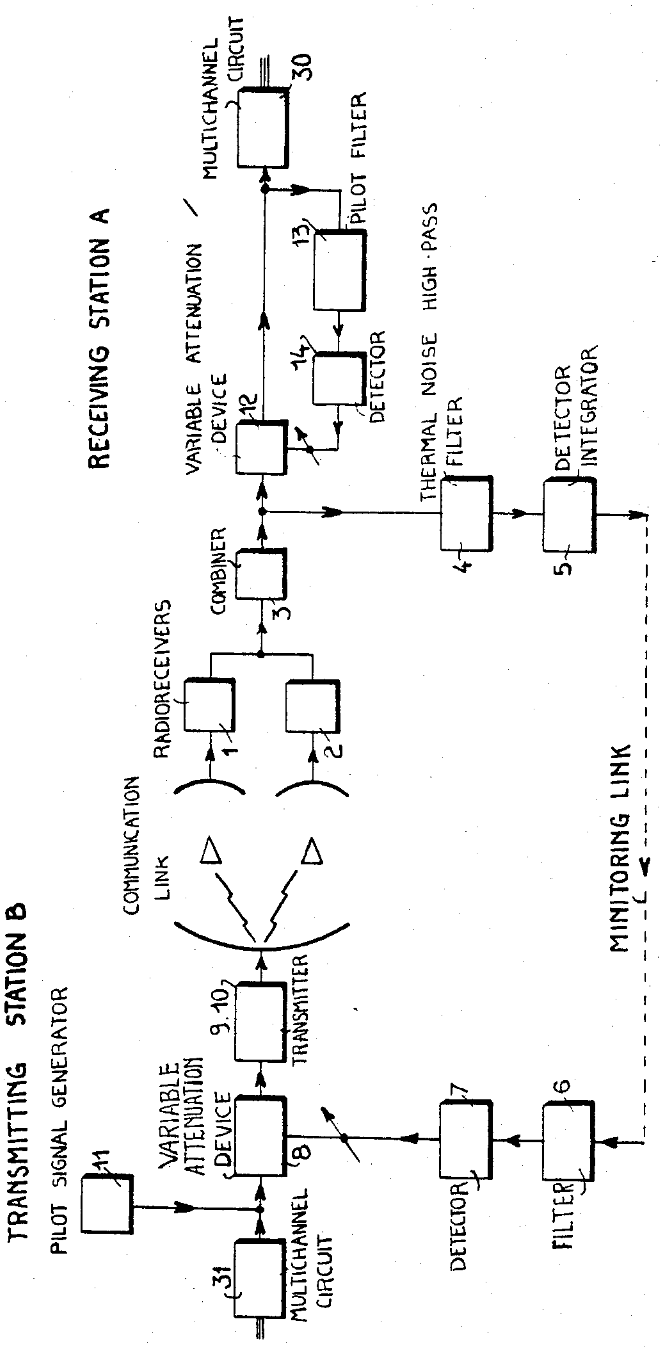
FIGURE 1 is a functional block diagram in the case of a one-way microwave radio communication system according to the present invention.

In the one-way communication system of FIG. 1, Station A is a receiver and Station B a transmitter. The signal transmitted by the Station B is received at Station A by a diversity reception system, made up of two aerials and associated receivers 1 and 2, and a combiner 3 of known type. The strongest signal is selected and the rapid fading is eliminated in the combiner 3 in accordance with current practice. At the output of the combiner 3 the complex signal, comprising both the information signal and the various noises, is fed both to the multichannel utilization circuit 30 via the variable attenuation device 12, whose operation will be described later, and also to a high-pass thermal noise filter 4 which eliminates the information signal. The filter 4 is followed by a detector-integrator 5 in which the noise is detected and which has a judiciously-selected time-constant making it possible to eliminate the rapid amplitude fluctuations of the noise. The resultant signal thus obtained is sent back by appropriate means as a monitoring signal to the transmission Station B where the monitoring signal indicative of the mean received signal strength $P_r$ is selected by a channel filter 6, and detected in the detector 7. The output of said detector controls a variable attenuation device 8 by appropriate means. The input signal from the input multichannel circuit 31 at Station B has mixed with it a voltage provided by a pilot oscillator 11 which imparts to it a reference level. The composite signal passes through the device 8, the attenuation value which is controlled by the monitoring signal indicative of the, and mean received signal strength $P_r$ as mentioned above. The composite signal therefore modulates the carrier in the transmitter 9, 10 of Station B with a variable freqency diviation $\Delta F$ as will be explained in greater detail later, the variations in frequency deviation are such that the signal to noise ratio at the receiver A is held at a maximum. The complex signal transmitted from B to A is received, and passes through the variable attenuation device 12. The said device is controlled in accordance with the amplitude of the reference pilot signal from pilot generator 11, which is selected at the output of variable attenuator 12 by the pilot filter 13, then detected in the detector 14; and applied to a control input of variable attenuation device 12 so as to maintain at its output a constant level of the information signal passing to the multichannel output circuit 30 of Station A.

Figure 2:
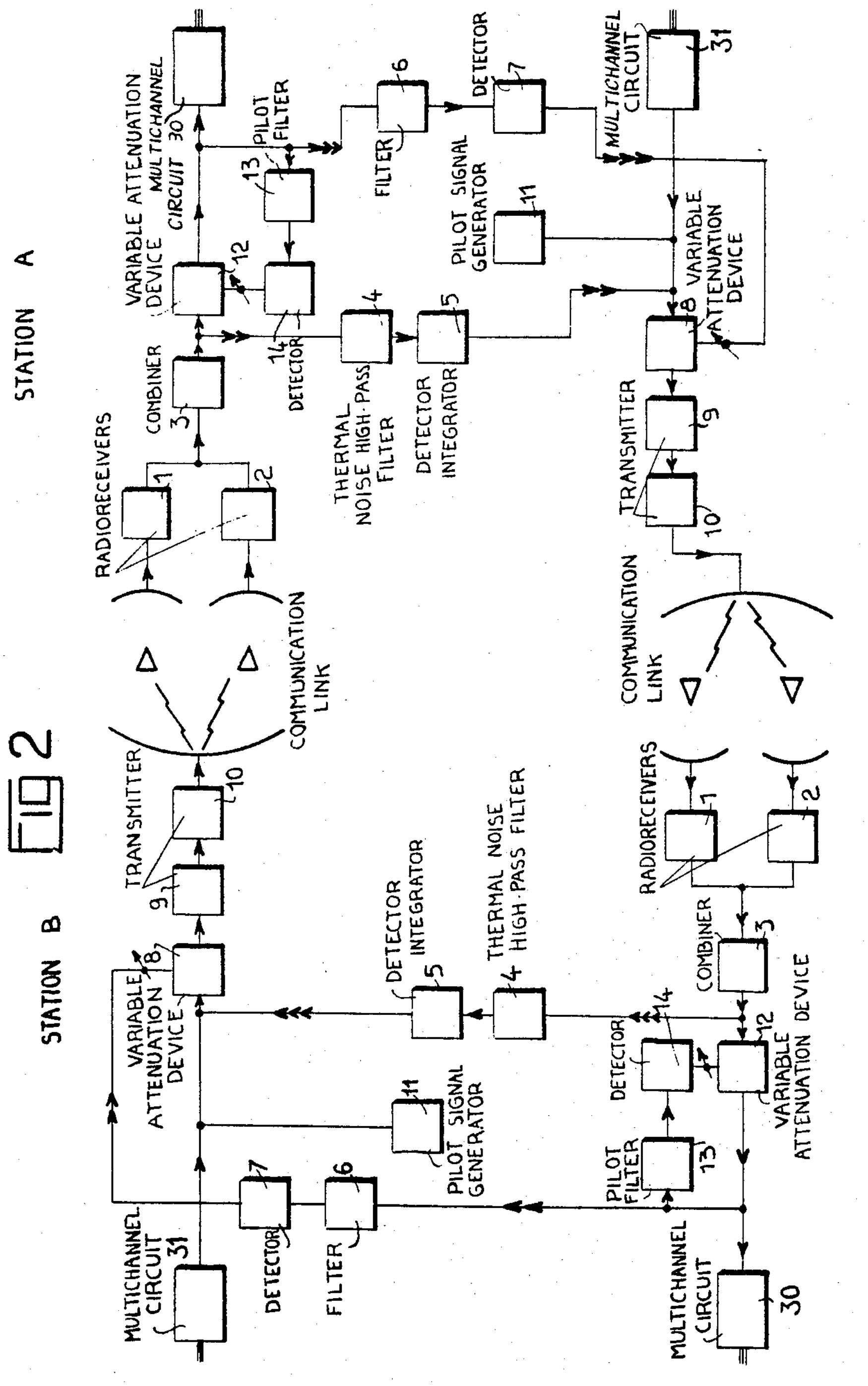
FIGURE 2 is a functional block diagram of a two-way system.

What has been said for one-way connection of FIG. 1 is also valid for a two-way connection as shown in FIG. 2.

In short, at whichever of the two stations A and B is being used as the receiving station, the noise is separated in filter 4 from the overall signal, detected and integrated in integrator S and the resultant monitoring signal is sent back to the other station acting as the transmission station where said monitoring signal, indicative of the mean received signal strength $P_r$ controls a line of variable attenuation. This retransmission of the monitoring signal, instead of occurring over a separately provided monitoring link such as the one indicated in broken lines in FIG. 1, in this case is effected over the one of the two communication links of the two-way system which for the time being is not being used to transmit intelligence. The multichannel input signal, with a superimposed pilot signal from pilot generator 11, as it passes through the variable attenuation device 12, is frequency-modulated with a variable frequency excursion $\Delta F$ which is a function of the monitoring signal and hence of the mean received signal strength $P_r$, and therefore at all times is optimum so as to maintain maximum signal to noise ratio (as later explained in greater detail). The overall signal is transmitted to A where, on reception, the multichannel output signal is made constant by a feedback of the reference pilot signal in the control loop 13–14–12 as described with reference to FIG. 1. The entire monitoring process is recommenced on each modification of the received signal strength, both in the system of FIG. 1 and in that of FIG. 2.

Figure 5:
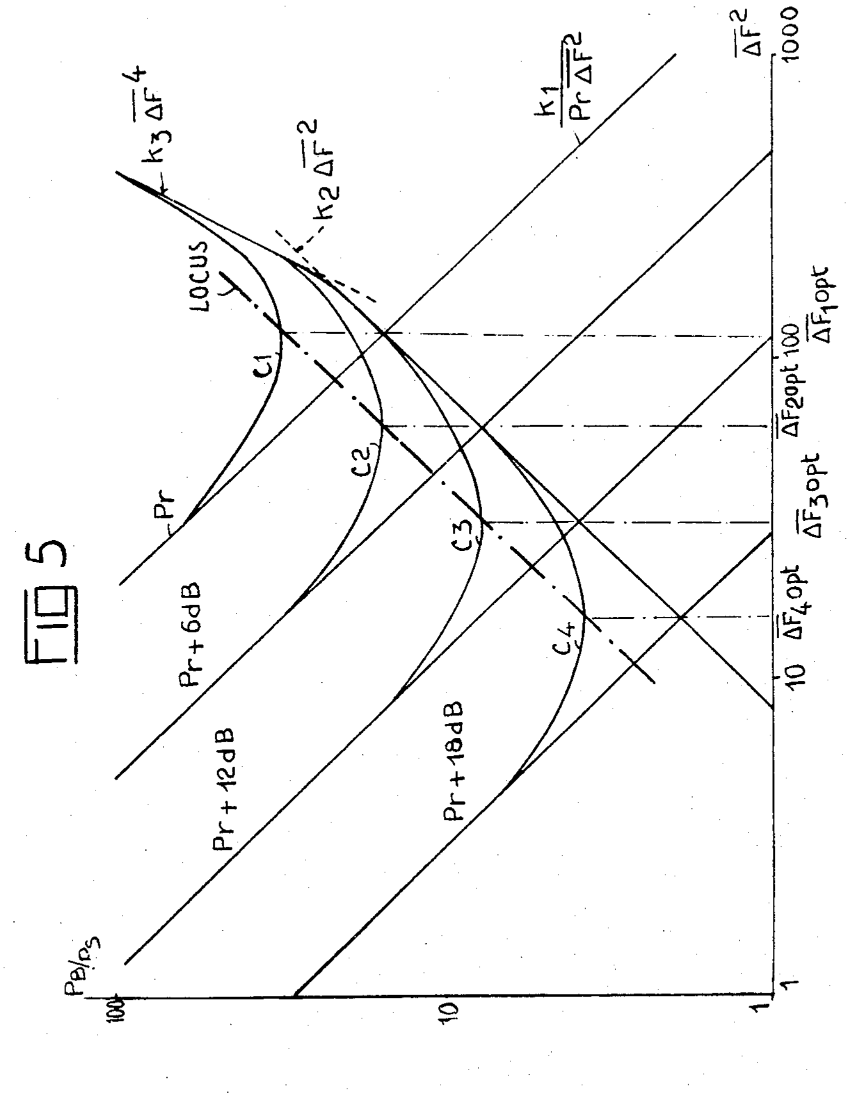
FIGURE 5 shows the variation curves of the ratio $P_B P_S$ as a function of $\Delta F$ for different values of the parameter $P_r$.

The precise manner of operation of the monitoring system of the invention to maintain at all times a substantially maximum signal to noise ratio at the receiver will be better understood with reference to the chart of FIG. 5.

This chart illustrates, plotted on a log-log scale using arbitrary units, a family of curves $C_1$, $C_2$, $C_3$ and $C_4$ representing the variations of the noise-to-signal ratio $P_B/P_S$ as a function of modulation frequency deviation squared $\overline{\Delta F^2}$. These curves are obtained in the following manner.

From the above given Equation 4 it is seen that the function $P_B/P_S$ is the sum of three terms of which only the first term $K_1/P_r\overline{\Delta F^2}$ is dependent on the parameter $P_r$. In the chart, this first term is represented by its log-log transform for each of four different values of the parameter $P_r$, as indicated, thus providing a family of four parallel straight lines of negative slope (sloping downward-rightward). The second term $K_2\overline{\Delta F^2}$ is represented by the single straight line of slope=1, and the third term $K_3\overline{\Delta F^4}$ is represented by the straight line of slope=2. The curves $C_1$–$C_4$ each have a minimum substantially as indicated, which represents the minimum value the function $P_B/P_S$ can assume for a given value of the parameter $P_r$. These curves are readily plotted by graphical means in the log-log representation here used. The geometric locus of the minimum of the function $P_B/P_S$ is readily obtained by standard analytic procedure and is represented on the chart by its log-log transform as the line designated "Locus" in chain lines.

It is evident therefore that when the mean signal strength $P_r$ at the receiving end changes, the optimal value for the frequency deviation $\Delta F$ which should be applied at the transmitting end in order to minimize the noise/signal ratio (i.e. maximize signal/noise ratio) varies as shown by said curve "Locus" in FIG. 5. Thus in the example shown in the figure, if the mean received signal strength (as measured by the integrator 5) is $P_r$ decibels, the optimal value for the frequency deviation is the value indicated as $\Delta F_{1opt}$; if $P_r+6$ db, the optimal value for the frequency deviation is $\Delta F_{2opt}$, and so on.

According to the invention, the frequency deviation as applied in the transmitter modulator 9 is automatically varied and held at its optimal value by varying the attenuation introduced by variable attenuator 8, under control of the monitoring signal indicative of the actual value of $P_r$ as applied over the monitoring link.

Two further modifications of the invention will now be described by way of example.

Figure 3:
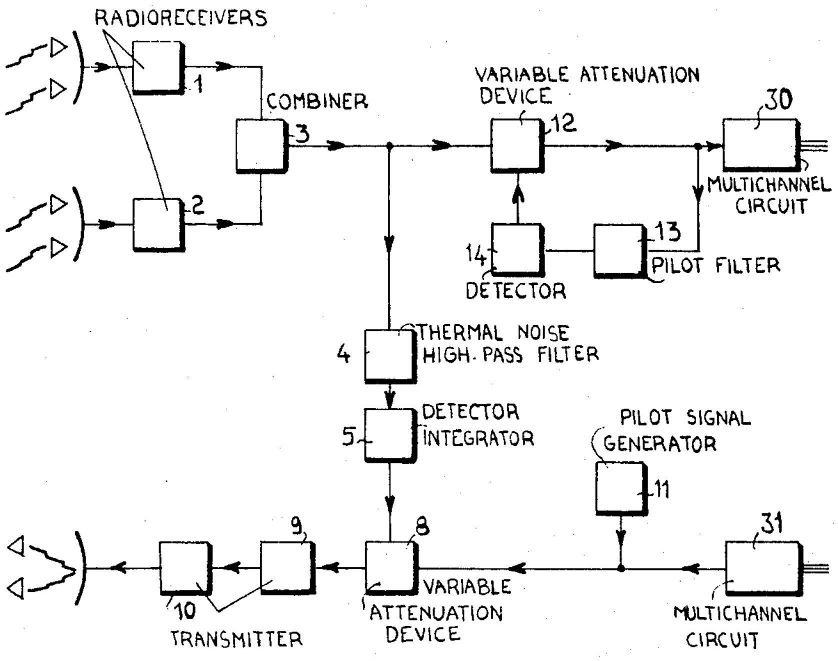
FIGURE 3 is a functional block diagram of one end station in two-way tropospheric radio-communication system.

In the modification of FIG. 3 the invention is applied to a radio communication system using tropospheric propagation. Its advantages are particularly notable in this case. It has already been said that in diversity reception the stronger signal is selected and the rapid fluctuations are eliminated in the combiner 3. However, diversity reception is unable to correct for long-term variations (daily and seasonal variations) and in general, all variations occurring in a correlated manner as between the various receivers. In most cases, it can therefore be concluded that any fluctuations which persist after combination in combiner 3 (i.e., practically, those disturbances which the system sets out to correct) occur in correlation as between the receivers and in both transmission directions. It would then be unnecessary to send the monitoring information back to the opposite station; it may be used locally.

This variant of the invention is shown in FIG. 3 which is a functional block diagram of one transmit-receive station of a two-way tropospheric link and the diagram differs from FIG. 2 in the omission of the filter and detector circuits 6 and 7 depending on the received signal strength and in the fact that the variable attenuation device 8 directly controlled by the resultant signal at the detector-integrator 5 output. Thus the level of the multichannel signal is controlled by the said resultant signal itself in correlation with the slow fluctuations in propagation conditions, and as a result maintains the optimum signal to noise ratio.

Figure 4:
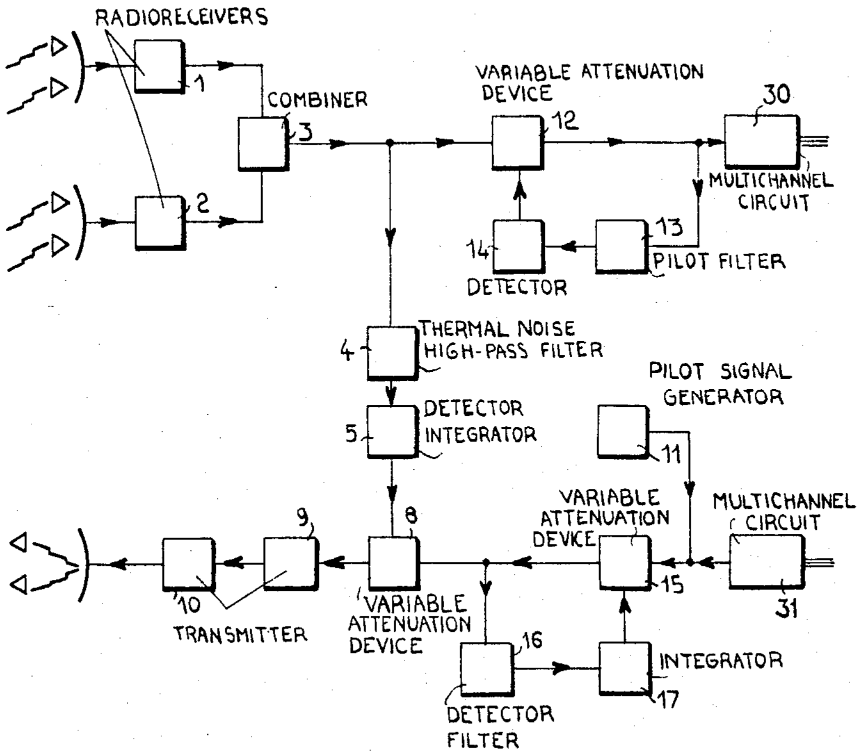
FIGURE 4 is a functional block diagram of one end station in a modified multichannel radio communication system.

The second variant, shown in FIG. 4, deals with a device according to the present invention applied to a two-way multichannel microwave communication system unevenly loaded as a function of time, that is, wherein the number of available channels actually used by the system varies with time in a generally unpredictable way.

The advantages of such a system are achieved only insofar as the best compromise between the thermal noise and the intermodulation noise can be substantially provided at each instant. In particular, this presupposes that their variation laws are known. The difficulty has heretofore been to some extent overcome by making various suitable assumptions as to the mean effective value of the frequency excursion. For example, where the number of telephonic channels N is less than 120, a technical specification issued by the C.C.I.R. (Comité Consultatif International Radioélectrique, Geneva, Switzerland), indicates that the equivalent power is given by $(-1+4 \log N)$ dbm at a zero relative level point.

These prior expedients have been only partly successful since the actual variations in load may depart very greatly from what is assumed by any such arbitrary equation. Thus, considering such a multichannel microwave system having not more than about 120 channels, the actual input signal load may vary greatly depending on the time and day. In order to achieve good reception with maximum signal to noise ratio, at each moment, the effective load of the microwave beam must be kept approximately constant. This result is fully accomplished by the new device according to the present invention shown in FIG. 4.

Most of the elements have been described already and so has their operation. Hence the following description only covers the new elements or arrangements particular to this modification.

In the transmission part of the two-way station shown the multichannel information signal again has a superimposed signal provided by the pilot oscillator 11, which signal gives a reference level.

These signals pass through a variable attenuation device 15 and are fed through the variable attenuator 8 to the transmitter. Directly at the output of the device 15 the multichannel signal is selected and detected in the filter-detector circuit 16, integrated in an integrator 17 and applied to the control input of variable attenuation device 15, thus providing a feedback loop, which keeps the effective level of the multichannel signal applied to the transmitter constant regardless of the number of input signals actually applied from the multichannel input 31.

The two variable attenuation devices 8 and 15, whose functions are different, have been drawn separately. However, they may be readily combined and in such case, the detector 5 may vary the reference level at the input of the modulator 9.

It should be noted that the above systems lead to widely variable and in some cases to very high frequency deviations. Secondary phenomena must then be taken into account, such as the appearance of a reception threshold at a high level resulting from the fact that a very wide mean frequency band corresponds to a strong frequency excursion.

However, the use of frequency compression or of carrier regeneration can readily eliminate this difficulty.

It will be appreciated that the foregoing description has been given by way of non-limiting example and that other modifications may be made without departing from the scope of the invention.

I claim:

1. In a frequency-modulation system including a transmitter and a receiver, said transmitter having frequency-modulation means for producing a frequency-modulated intelligence-bearing signal and means for transmitting said signal, the provision of a monitoring arrangement for at all times maximizing the signal-to-noise ratio at the receiver comprising:

a high-pass thermal noise filter connected to the receiver for selectively deriving a signal corresponding to a thermal noise component accompanying the received intelligence-bearing signal as an indication of the strength of said latter;

integrator means connected to the output of the filter means for deriving from said thermal noise signal a monitoring signal corresponding to averaged thermal noise;

variable means connected to said frequency-modulation means for modifying the frequency-deviation of said intelligence-bearing signal; and means connected for varying said variable means in accordance with variations in said monitoring signal whereby to maintain said frequency-deviation substantially at its optimal value corresponding to minimum noise-to-signal ratio at the receiver.

2. The system defined in claim 1, further including means at the transmitter generating a reference pilot signal and means for transmitting said pilot signal together with the intelligence-bearing signal; further variable means connected to the receiver output for modifying the level of the output signal delivered thereby; and means connected for sensing the pilot signal and controllingly connected to said further variable means for modifying the level of the output signal in accordance with variations in said received pilot signal so as to maintain the level of both the pilot signal and the intelligence-bearing signal substantially constant at the receiver output.

3. The system defined in claim 2, wherein said further variable means comprises a variable attenuator device.

4. The system defined in claim 1, wherein said variable means comprises a variable attenuator device.

5. The system defined in claim 1, including means defining a first transmission link for transmitting said intelligence-bearing signal from the transmitter to the receiver, and means defining a second and separate transmission link for transmitting said monitoring signal from the receiver to the transmitter.

6. In a two-way frequency-modulation communication system including a first and a second stations each including a transmitter and a receiver, means defining a first transmission link from the first-station transmitter to the second-station receiver and means defining a second transmission link from the second-station transmitter to the first-station receiver, each transmitter including frequency-modulation means for producing a frequency-modulated intelligence-bearing signal and means for transmitting said signal over the related transmission link, the provision of a monitoring arrangement for at all times maximizing the signal-to-noise ratio at each receiver comprising:

A high-pass thermal noise filter connected to the receiver and integrator means connected to the output of the thermal noise filter which convert the thermal noise signal into a mean resultant signal as an indication of the strength of said received signal;

means for transferring a monitoring signal derived at the first station over the first transmission link to the second station and means for transferring a monitoring signal derived at the second station over the second transmission link to the first station;

variable means at each station connected to the frequency-modulation means of the related transmitter for modifying the frequency-deviation of said frequency-modulated intelligence-bearing signal transmitted thereby; and means applying the monitoring signal transferred to each station to the variable means at said station to vary said variable means during the transmission of the related intelligence-bearing signal in accordance with variations in said monitoring signal whereby to maintain said frequency-deviation substantially at its optimal value corresponding to minimum noise-to-signal ratio at the receiver of the other station.

7. In a multichannel frequency-modulation communication system including a transmitter and a receiver, the transmitter having multichannel input means for a plurality of input intelligence signals in varying number, frequency-modulation means for producing a multichannel frequency-modulated intelligence-bearing signal and means for transmitting said multichannel signal and said receiver having means for demodulating the received multichannel signal and multichannel output means for delivering the demodulated intelligence signals, the provision of a monitoring arrangement for at all times maximizing the signal-to-noise ratio of the received signals comprising:

variable means connected between said multichannel input means and said frequency-modulation means of the transmitter;

means responsive to the input signal load as determined by the number of intelligence signals applied from said multichannel input means and connected for varying said variable means so as to maintain the total signal level effectively applied to said frequency-modulation means substantially constant regardless of variations in said input signal load;

a high-pass thermal noise filter connected to the receiver and integrator means connected to the output of the thermal noise filter which convert the thermal noise signal into a mean resultant signal as an indication of the strength of said received signal;

means connected for further varying said variable means in accordance with variations in said monitoring signal whereby to maintain the frequency-deviation of said transmitted multichannel frequency-modulated intelligence-bearing signals substantially at its optimal value corresponding to minimum noise-to-signal ratio at the receiver.

8. The system defined in claim 7, wherein said variable means comprises at least one variable attenuation device.

9. The system defined in claim 7, further including means at the transmitter generating a reference pilot signal and means for transmitting the pilot signal together with the intelligence-bearing signals; further variable means connected to the receiver output for modifying the level of the output signals delivered thereby; and means connected for sensing a received pilot signal and controllingly connected to said further variable means for modifying the level of the output signal in accordance with variations in said received pilot signal so as to maintain the level of both the received pilot signal and the received intelligence-bearing signal substantially constant at the receiver output.

References Cited by the Examiner

UNITED STATES PATENTS

| | | | |
|---|---|---|---|
| 2,424,830 | 7/1947 | Kenefake | 325—147 X |
| 2,924,703 | 2/1960 | Sichak et al. | 325—31 |
| 2,965,717 | 12/1960 | Bell | 325—62 |
| 2,967,908 | 1/1961 | Gray et al. | 178—69 |
| 3,101,446 | 8/1963 | Glomb et al. | 325—67 |
| 3,104,356 | 9/1963 | Hedger | 325—348 X |
| 3,160,813 | 12/1964 | Biggi et al. | 325—56 |
| 3,195,047 | 7/1965 | Ruthroff | 325—46 |

DAVID G. REDINBAUGH, *Primary Examiner.*

B. V. SAFOUREK, *Assistant Examiner.*